United States Patent [19]

Barsellotti et al.

[11] 4,221,935
[45] Sep. 9, 1980

[54] CONTROL CIRCUIT FOR TELEPHONE SUBSCRIBER STATION

[75] Inventors: John A. Barsellotti; Fahim Ahmed, both of Guelph, Canada

[73] Assignee: International Standard Electric Corporation, New York, N.Y.

[21] Appl. No.: 945,205

[22] Filed: Sep. 25, 1978

[30] Foreign Application Priority Data

Oct. 24, 1977 [CA] Canada .................................. 289313

[51] Int. Cl.$^2$ .......................................... H04M 13/00
[52] U.S. Cl. ................................. 179/17 E; 179/17 D
[58] Field of Search ................. 179/17 E, 17 A, 17 B, 179/17 D, 17 R, 99, 2 EA, 2 EB, 84 SS

[56] References Cited

U.S. PATENT DOCUMENTS

| | | | |
|---|---|---|---|
| 2,874,223 | 2/1959 | Hutton | 179/17 E |
| 2,923,776 | 2/1960 | Richards | 179/17 E |
| 3,026,377 | 3/1962 | Sullivan | 179/17 E |
| 3,566,039 | 2/1971 | Saunders | 179/17 D |
| 3,689,705 | 9/1972 | Pinede et al. | 179/17 E |
| 3,919,487 | 11/1975 | Gabrielson | 179/17 R |

*Primary Examiner*—Gerald Brigance
*Attorney, Agent, or Firm*—James B. Raden; Marvin M. Chaban

[57] ABSTRACT

A control apparatus for providing added service telephone features for stations of a multiple party line. Features provided are automatic number identification, party line privacy, fully selective ringing, remote station verification and disconnect and revertive calling. Apparatus to provide these features includes as the control logic, a conventional microprocessor acting on external logic and buffer memory interfacing with the line conductors. The external logic and buffer memory sense the input condition changes and provide signals indicative of these changes to the processor. The external logic and memory maintain a condition and monitor the line for condition change.

10 Claims, 5 Drawing Figures

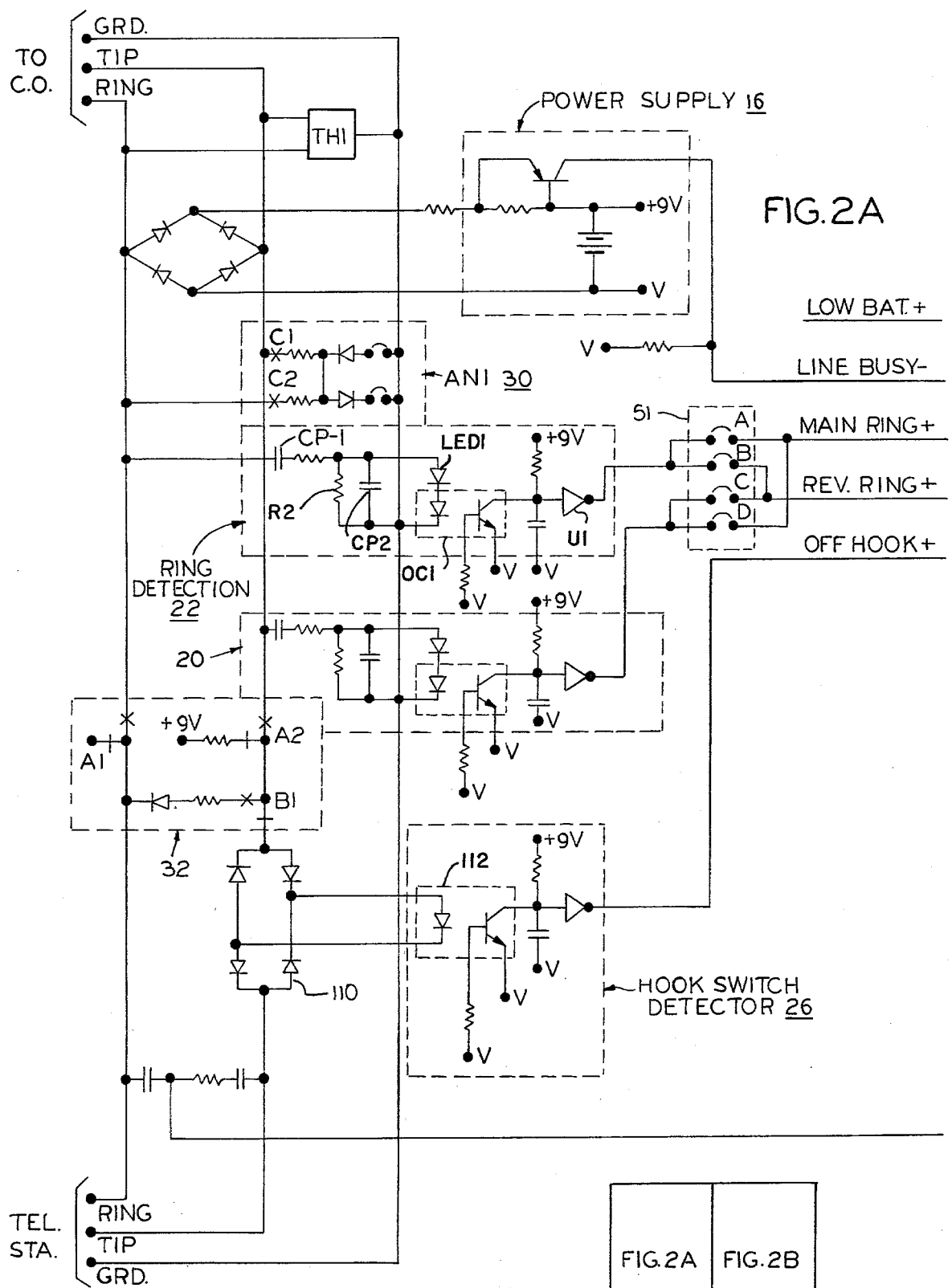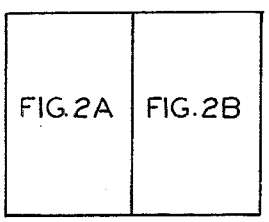

CONTROL CIRCUIT FOR TELEPHONE SUBSCRIBER STATION

BACKGROUND OF THE INVENTION

Multiple party lines are well-known and are still in use in the more rural areas where economics militate against long spans of separate conductors to individual isolated subscribers.

For multiple party lines, the provision of features generally available on single party lines is generally an expensive complex process. One approach is to use subscriber multiplex apparatus for carrier signaling across a span line. This alternative is an expensive one and therefore not economically justifiable in many locations.

Other apparatus provides on a piecemeal basis certain of the features called herein single line features. For example, automatic number identification for party lines is known. One known method is to supply each handset with an oscillator, the stations of a line each generating a different frequency to be detected at the central office. Othere features have been provided, each requiring a separate package to be powered from local current in a power pack or in some cases, from the line.

Privacy is provided, for example in key systems, by a multiple relay apparatus for example, U.S. Pat. No. 3,931,478 issued Jan. 6, 1976 to B. J. Warman, and U.S. Pat No. 3,299,217 issued Jan. 17, 1976 to J. E. Burns. Such systems provide one or more features and are not readily mated with a station instrument.

SUMMARY OF THE INVENTION

A main feature of the present invention is the provision of a unit which can be provided for stations of a party line to provide a plurality of well-known single line features in an electrically isolated and buffered unit.

A further feature of the invention is to provide a subscriber line control apparatus for multi-party lines using a microprocessor as the main logic and memory. Hard wired logic and memory interface with the processor to sense the condition of the line and to produce output condition controls the line.

Another feature of the invention is to provide a circuit which can be packaged in an inexpensive unit associatable with a station of a multiple-station. The features which may be provided include reverting call, automatic number identification, and remote station disconnect in addition to single party features such as line privacy.

To provide these and other features, the circuit includes as the main memory and logic, a commercially obtainable microprocessor and interfaces that processor with the station logic being controlled by means of hard wired logic and buffer memory. A programmable switching array allows ready setting of ringing codes and number identification for the processor. A set of control relays (three) of the magnetic latching type are used to control the condition of the circuit as directed by the processor.

The circuit is associated with a station instrument and is physically positioned adjacent that station. The circuit detects an off-hook condition of the station associated with the circuit and in response powers itself from a standby state to an active state. The circuit determines whether the line is idle, and signals the calling station accordingly. If the line is idle, the station is connected to the line to thereafter busy the line to other stations of the line. The call preceeds in the normal fashion until the calling station hangs up, at which time the unit enters a power down state awaiting further input signals.

The unit also detects ring signals on either line lead to turn on power to the unit, to connect an idle called station to the line and transmit ring signals of the proper type to the station ringer. Other stations are held from the line during the pendency of a call to the called station.

Logic is provided for detecting reverting calls to other stations of the line, and for remotely disconnecting a station from the line to discontinue service to that line and for remotely connecting a station to the line when service is to be resumed.

These and other objects and features of the invention will become apparent from the following explanation viewed in connection with the drawings described briefly hereafter.

DETAILED DESCRIPTION OF THE DRAWINGS

Figure 1:
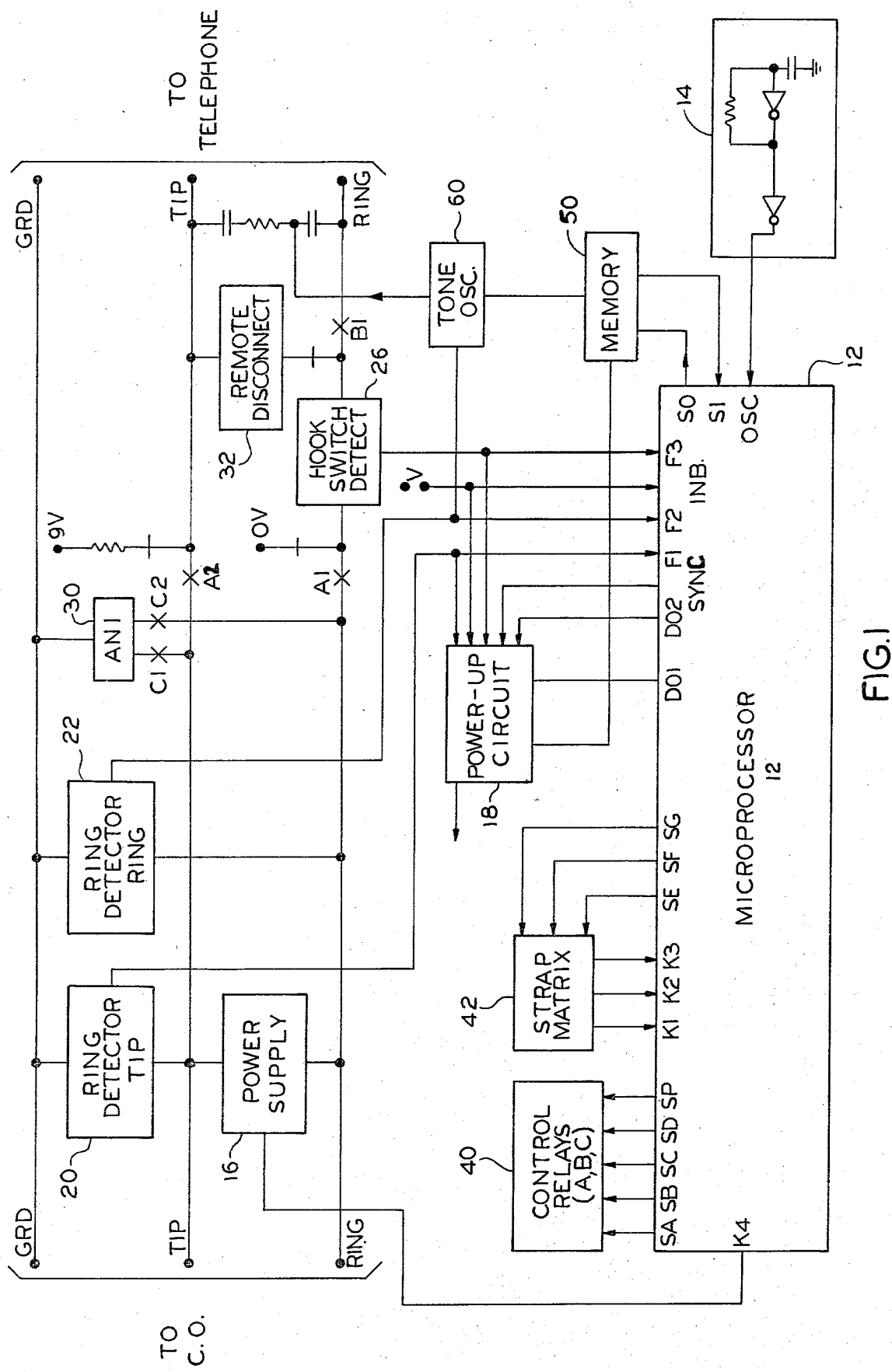
FIG. 1 is a block diagram of the unit of our invention.

In FIG. 1, we show the block diagram of our circuit which is applied to one station of a multiple party line. Preferably all stations of a line would be similarly equipped. Each circuit as shown includes discrete components and logic in the form of a microprocessor 12. Processor 12 may be any one of a number of processors using an 8 bit instruction set. The processor selected for the best mode of operation is the MM 5799 Calculator Oriented Processor, manufactured and sold by National Semiconductor Corporation.

A system clock 14 provides clock pulses for controlling the processor 12 over the lead OSC. For powering the processor 12, a power supply circuit 16 receives its power from the line responsive to signals received from the power up circuit 18 on sensing of a need for the activation of the circuit.

Also shown in FIG. 1, are a detector 20 for the tip lead and a detector 22 for the ring lead. These circuits detect the conditions of the specific line leads to signal the processor over the F1 and F2 leads. A hookswitch detector 26 signals the condition of the station hookswitch to signal the processor over lead F3. These detectors monitor the line condition to provide inputs to the processor and to signal the power supply to place the circuit in an active condition.

Further, FIG. 1 shows the automatic number identification (ANI) circuit 30 for producing output to the line, and remote disconnect circuit 32 for responding to a disconnect or connect signal to either remove the station from service or restore the station to the line for service.

in FIG. 1, we also show a configuration of three control relays 40 comprised of A, B and C relays. These relays are magnetically latchable to open or close circuits to the line and hold the condition, once set. The relays are operated or set by the processor 12 to produce the circuit outputs.

Also external to the processor is the strap matrix 42 comprised of a programmable switch array for allowing the setting of the processor response for number identification outputs and the like.

An external memory 50 which may be a dual, four bit serial in parallel out shift register is used as a temporary or buffer register memory maintained in an active condition even when the rest of the circuit is in a standby or inactive state.

Figure 2B:
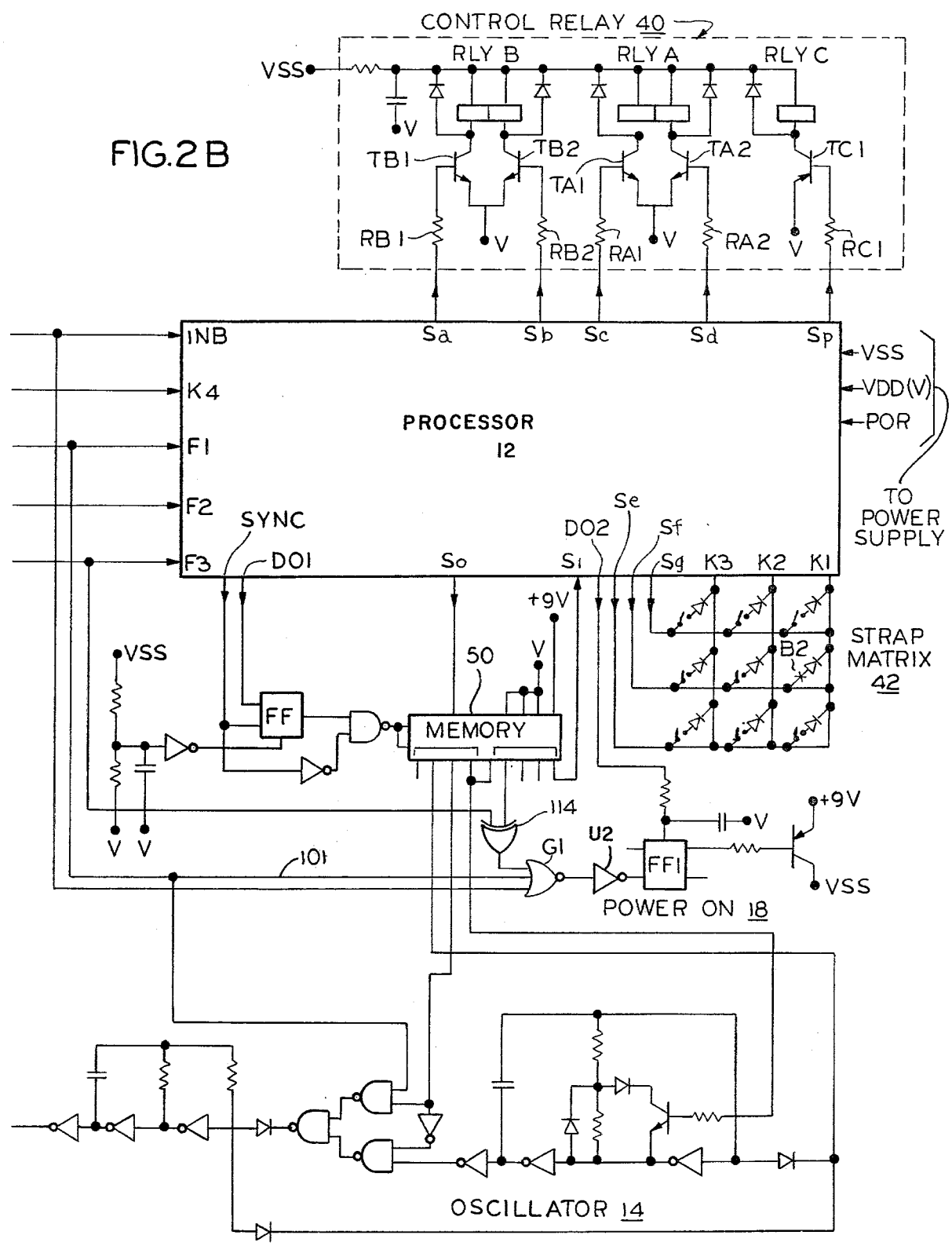
FIG. 2 is a block showing the positions of FIGS. 2A and 2B, the latter figures being a detailed showing of circuits of FIG. 1.

In FIG. 2, we show in greater detail the components making up the blocks of FIG. 1, their interconnection and their connections to the processor 12.

Shown are the three output condition control relays A, B and C, each being magnetically latchable to hold a condition once set, even after the power is disconnected from the processor 12 from which it receives its state change signals. Relay A has its inputs from the processor over leads Sc and Sd, intermediately through the switching transistors T1 and T2 over a path through resistors RA1 and RA2 respectively. This relay has two windings and is operated responsive to a coded ringing signal representing the station to which the processor is coupled to switch its contacts A1 and A2 and close a ring path from the CO to the station.

Relay B is similarly configured as a magnetically latched relay with two windings and is operable from the processor over leads Sa and Sb, and paths through resistors RB1 and RB2 respectively to the bases of transistors TB1 and TB2. This relay is also magnetically latched and provides the remote disconnect feature. On operation of relay B, contacts B1 switch and open the tip lead to the station. Contacts B2 in matrix 42 also close. In this manner, so long as the B relay remains latched in its operated state, the tip lead remains open between the CO and the station and the path to the station of the processor 12 remains open. Further the condition of contacts B2 can be monitored at any time to determine whether the station is connected to the line or not.

Relay C is used to provide automatic number indentification to the central office. The relay has a single winding, and preferably is magnetically latchable. This relay is energized on a signal from lead SP from the processor through resistor RC1 and transistor TC1.

As mentioned previously, the processor 12, oscillator 14 and the relay bus are normally deenergized to minimize power consumption of the device. The processor and other devices are only energized in response to input conditions such as detected ringing or station off-hook, or inquiry signals from the central office.

In FIG. 2, we show the tip lead detector 20 and ring lead detector 22, each of which includes a decoupling capacitor CP1 on the input lead feeding a resistor R1 and in parallel therewith resistor R2, a capacitor CP2 for integrating the input signal to produce a square wave output, and LED-1 of optical coupler or isolator OC-1. The output of the isolator OC-1 passes through amplifier U1 to one of the ring leads dependent on the strapping at strap-S1. For normal operation, we assume straps A and C are closed to provide ring lead detection on prcessor terminal F1, and trip lead detection on processor terminal F2. Assuming strap C to be closed, the ring signal causes a signal of voltage V to be impressed on lead F2 of the microprocessor. In addition, the signal V also is transmitted on lead 101 to gate G1. This NOR gate passes a signal through amplifier U2 to flip-flop FF1. The flip-flop changes state and provides +9 volts to terminals Vss to power and relay bus and the microprocessor Vss lead. The power on these leads energizes the relay bus and the microprocessor.

The ringing for a four party line provides an address signal by using coded, grounded ringing comprised of short or long bursts over a six second period comprised of twelve half second slots with the bursts being of ½ second duration (short) or one or more seconds duration (long).

The incoming pulses are integrated for transmission of a signal from the optical coupler through the strapping conductors to lead F1 or F2 to the processor 12. Within the processor, the first pulse signal turns on the processor to receive further signals for comparison with signals derived from the strapping at matrix 42 as will be described later.

All processors on a line being rung are energized responsive to the first pulse. The pulses are stored and compared in all such processors following a check of the condition of the B relay. If the B relay has been latched in the energized condition, the station has been disconnected from the line due to a station disconnect signal and no response to the signal will be provided. For all stations for which the B relay remains deenergized, the comparison of received signals against matrix derived signals occurs to cause operation of the A relay of the desinated station.

With the desired A relay operated, contacts A1 and A2 switch to complete a ringing path to the identified station from a ring source. Ring signals pass through closed contacts A1 and A2 may be ordinary uncoded ring signals.

When a station of the line goes off-hook, whether it be in response to ringing or for the initiation of a call, closure of the tip and ring loop occurs at the station. The resulting current flow passes through the bridge rectifier 110 and the optical coupler 112 of hookswitch detector 26 to lead F3 to signal this condition to the processor for response. The F3 input signal also passes to OR gate 114 and gate G1 to switch the flip-flop FF1 to the on condition. If the gate is already on, no change occurs.

The memory 50 is powered at all times to maintain a last-condition memory, the memory 50 having low power requirements. The memory is used to control supervisory functions such as the station going on hook.

also shown in FIG. 2 is the tone oscillator 60 which provides tones such as ring tone, ring back tone and busy tone to the station in response to an input condition when compared with the status of the station as indicated by memory 50.

Figure 3:
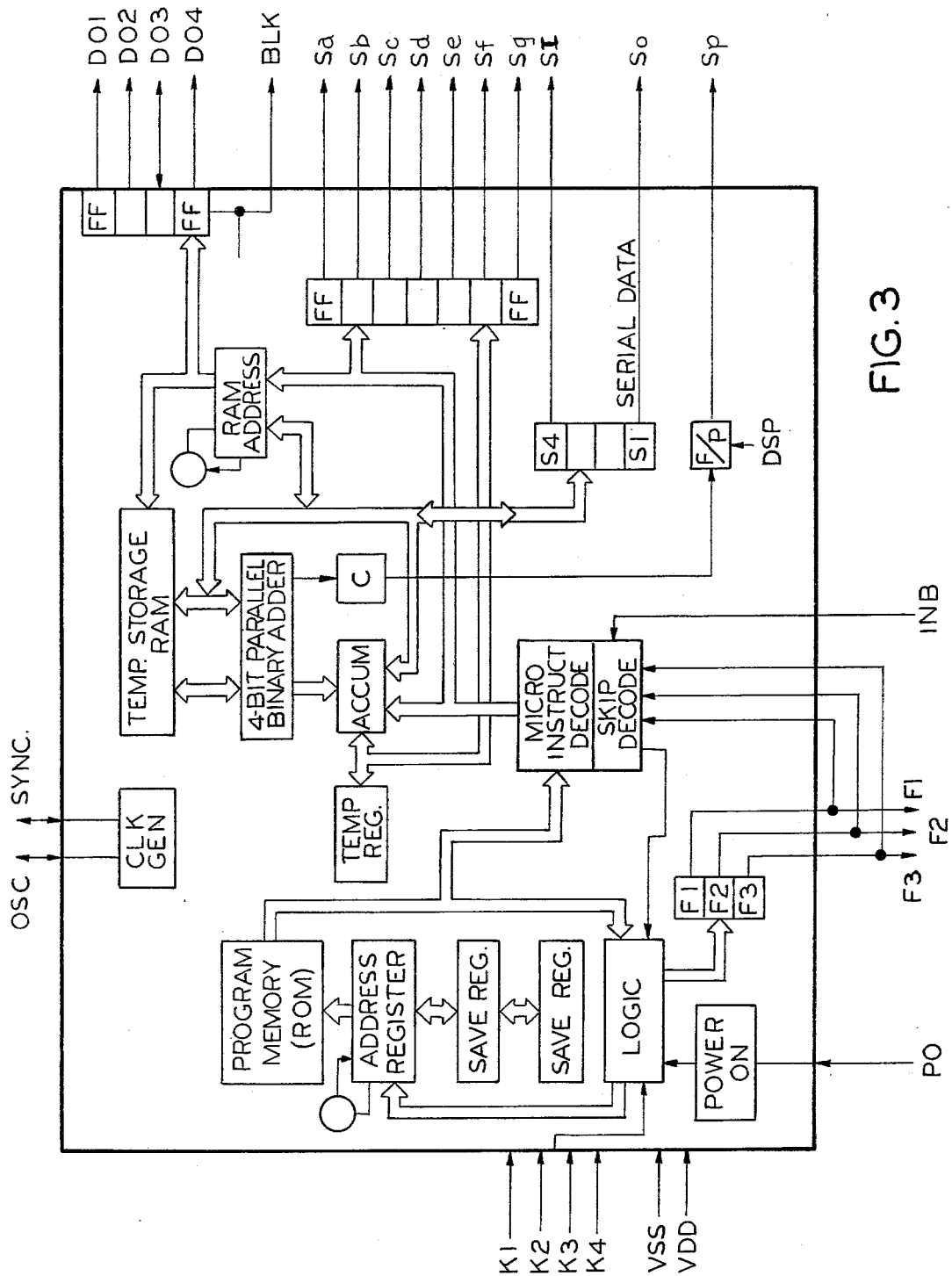
FIG. 3 is a block and flow diagram of the microprocessor of FIG. 1.

If FIG. 3, we show the manufacturer's block diagram of the processor 12. This processor contains a ROM 310 used as program memory, a temporary storage RAM 320 with suitable logic 330. Various flip-flops F1–F3 and DO1–DO4 are used as inputs to the processor while flip-flops 340 and 350 (S1–S4) provide ouptus from the processor to the system, the functioning of which will now be described.

The operation of the circuit will now be described. First regarding the remote disconnect feature, two approaches to providing this feature will be described. As approach #1, from the line is a signal comprised of a series of fixed duration pulses from the C.O. on bothe the tip and ring leads. The same code is applied on both leads, the signal passes through detectors 20 and 22 and leads F1 and F2. The signal from lead F1 passes through lead 101 to gate G1 and flip-flop FF1 of the processor to power the processor by connecting +9 volts to terminal Vss.

In the processor, the signals on leads F1 and F2 set the flip-flops F1 and F2 of the processor to cause the storage of signals on the RAM 320. The verification code comprises the ring response code on both the tip and ring leads. Comparisons are made between the stored indicating signals in the RAM and signals stored in the RAM as derived from the matrix strapping. When a match is found between the verification code and the strap code, then the A relay of the addressed line is energized. The purpose of the input code is therefore to select the proper station. The condition of the B relay contacts is then checked to ensure the station is connected before action is taken.

The processor times a period of six seconds after the end of receipt of the verification code and awaits a reversed, properly coded signal from the C.O. Only the prepared (or previously addressed) device will respond to the second reversed code signal, and will check the code against the matrix strapping once again. The prepared device responding to the second reversed code will operate the B relay of that device to switch contacts B1 and open the tip lead of the station being disconnected. The disconnected station will remain disconnected until again addressed by the specific ring code on both tip and ring leads from the C.O. The addressed and prepared device will respond to a reversed properly coded signal to change the state of the B relay and restore the tip lead and the station to service. In this way, a station may be disconnected from the line and reconnected to the line when such action is indicated.

The Central Office may test any station device to determine its connect/disconnect status by applying a verification code to the station. The condition of the B relay is then read. The device times itself out in six seconds since no command will have been received after receipt of the address code.

The second approach to providing the connect/disconnect feature comprises addressing a device by sending a special ring code. Since each station of the line has a separate ring code, only one unit of a line will be addressed by the special ring signal applied.

On receipt and recognition of its address code, the called unit will place a loop on the line for a period of six seconds. If the unit is in the disconnect mode, a tone is sent to the line by oscillator 14.

When the condition of a unit is to be changed i.e., reconnected or disconnected, a VF command is sent from the C.O. during the six second timed period during which an addressed unit remains enabled. Since only one addressed unit is enabled, only that one unit will respond to the VF signal.

Turning now to the response of the circuit to ringing, when a unit is rung the detector connected to the lead over which the ring signals are received is actuavated. The detector integrates the received signals into essentially square waveforms, either short or long in duration. As mentioned, the incoming ring signals comprise short or long bursts during a six second ring interval. The signals pass over lead F1 or F2 into the processor for storage. The first input signal to the processor resets the three flip-flops F1, F2 and F3 to receive input signals. The ring signals also pass into the skip decoder 360 for storage in the processor RAM using the accumulator.

At the end of the six second ring address period, leads K1–K3 are sampled to determine the strapping for comparison of signals derived from the strapping against the received signals. The sampling of the strap matrix is controlled by a sequential activation of leads DO1–DO3. If the strap code agrees with the received code, contacts B2 are tested. If contacts B2 are open indicative of a connected station, the memory 50 is set over the 50 lead by a series of status bits and the A relay is operated over the Sd leads to connect the instrument of the addressed station to the telephone line.

All units of a line are activated by the first ring burst applied to the line, but only the unit whose address compares with the addresses of the received ring signals operates its A relay.

An A relay once operated, magnetically latches to its operated state to forward ring signals thereafter to the addressed station. Ordinary ring signals are forwarded over the closed A relay contacts to the called station.

During the receipt of the normal ring signals, all units of the line remain activated. If a station other than the one being rung goes off-hook during the ring process, the hookswitch detector of the specific unit responds sending a signal over lead F3, into flip-flop F3. The F3 signal on a unit not exhibiting the memory condition occuring as a result of succerssful comparison of ring against matrix strapping causes an output on the SO lead to memory 50. From the memory, signals are fed to the oscillator 14 to produce a busy tone to the station having gone off-hook.

When the station being rung goes off-hook, the hookswitch detector produces an output on lead F3 of this unit. A comparison check is made at the memory and if the station is the one being rung, the lead DO2 is set to shut off power to the processor. The data in the memory is set to indicate a call in process.

The central office detects the off-hook condition or loop closure condition continuing to cause ring trip at the C.O. With the A relay contacts closed, a call path is completed to allow normal conversation between the calling line and the off-hook previously addressed station.

Call supervision is controlled at the C.O. The hookswitch detector in the unit sensed when the station goes on-hook to notify the shift register memory 50 over lead SO from the processor. The central office receives the on-hook signals to terminate the call there.

This hookswitch signal causes gates 114 and G1 to set the power on flip-flop FF1. The signal is received by the processor causing a signal to be sent on lead SO to the shift register memory. Lead Sc is activated to cause the A relay to be deenergized jopening the line path to the station. On lead SI, an indication of the station condition read out of shift register 50 is fed to the processor memory. The power is shut off after a timed interval and the unit is returned to its at rest condition.

For a call outgoing from a station, the first indication is the hookswitch detection of the voltage change. A busy check is made at the unit by sampling the condition of lead K4, the line busy lead. If the unit of another station is busy, the bits indicating this condition are fed to the shift register memory 50 to enable the oscillator 14 to send back busy tone to the station having gone off-hook. The busy tone remains on until the station goes bock on-hook. With the start of busy tone, the circuit powers itself off and remains off until the hookswitch detector detects a condition change. On the change, the tone oscillator is reset and the circuit powers down.

When a conversation is in process, any one attempting to break it will receive busy tone. If the hookswitch of another station of the line is flashed for a time duration of from 600 to 1600 ms, the circuit powers up on the detected hookswitch condition change. The processor times the duration of the hookswitch flash and if found to be within the limits noted, a signal is sent on the Sd lead to operate the A lead of the breading-in station. A multiple bit signal on lead SO sets the shift register to enable oscillator 14 to emit break in tone. The unit then powers down while the break in tone remains as long as the breaking in station remains in the conversation.

On an outgoing call, as previously described the A relay operates and the unit powers down. On a long distance call, the C.O. sends an automatic number identification (ANI) signal at the conclusion of dialing. As a result of this signal, relay C is operated over lead Sp to close its contacts C1 and C2 to place the diode combination signals out on the line. This diode combination provides an identification of one out of the four stations of the line.

When a call is made from one station of a line to another station of the same line (revertive call), the nature of the call is recognized by the C.O. to send busy tone. The station subscriber performs a hookswitch flash (600 to 1600 ms) which is detected by the hookswitch detector 26 to produce a signal on lead F3 and the A relay is reset. The C.O. recognizes the off-hook condition and sends the revertive tone to the unit on lead F2. The processor causes ring tone to be sent to the called station. When the called station goes off-hook, the C.O. recognizes the closed loop and the A relays of both units are operated. A temporary memory condition signal is stored awaiting either party going on-hook.

We claim:

1. A control circuit adapted for use with a station of a multiple party telephone line to provide single line circuit features for that line with said circuit being individually coupled to that station, said circuit including means for detecting ringing signals applied to the line from the office to which the line is coupled, logic means, means for enabling said logic means in response to the detection by said detecting means of ring signals said logic means including programmable means for storing data indicative of coded ringing signals and being operative when enabled to receive and analyze coded ringing signals applied to the line by comparison of the code of subsequent ringing signals against said stored data to determine whether the station to be signaled, said sotred data being derived from a preset indicator of ringing signal codes, and means responsive to a successful comparison for forwarding ringing signals to said station.

2. A control circuit as claimed in claim 1 in which said programmable means comprises a data processor, and in which said indicator comprises a matrix of settable switches for signaling said processor.

3. A control circuit as claimed in claim 2, in which said line includes a tip lead and a ring lead, an in which there is ring detecting means for each of said leads individually responsive to said ring signals received over the respective lead to forward said subsequent signals to said logic means.

4. A control circuit as claimed in claim 1, in which there is means for detecting a change in the condition of the hookswitch of the station, and said processor includes means for terminating the transmission of ringing signals to said station and providing a ring trip signal to the office to which the line is coupled in response to a detection of a hookswitch condition change by said hookswitch condition detecting means 5. A control circuit as claied in claim 4, in which said hookswitch condition detecting means responds to a change in the condition of said hookswitch in the absence of ringing signals to enable the logic means for receipt of ringing signals and other signals.

6. A control circuit as claimed in claim 1, in which said logic means is responsive to special signals from said office and in which there are means responsive to the receipt by said logic means of said special signals to remotely disconnect said station from said line.

7. A control circuit as claimed in claim 6, in which said remote disconnect means comprises a latching relay, and said ring signal forwarding means comprises a second latching relay.

8. On a multiple party telephone line having a station representing each party, a plurality of control circuits, each adapted to be permanently associated with and coupled to a respective one of said stations to provide single line features for the stations of that line, each said circuit including means for receividng ringing signals applied to the line from the office to which the line is coupled, each circuit including logic means and memory means, means for enabling the logic means and memory means of each circuit in response to detection by said receiving means for coded ring signals, each ring signals applied to the line and analyzed said subsequent coded ringing signals by comparing their with responsive to a successful compasion within its logic, for forwarding ringing signals its associated station.

9. On a telephone line as claimed in claim 8, in which each said logic means comprises a programmable data processor, and in which said preset code, indicators comprises a matrix of settable switches.

10. On a telephone line as claimed in claim 8, in which each control circuit includes means for detecting the condition of its hookswitch going off-hook, and in which there are condition memory means in each circuit for analyzing the condition of its associated station to busy the line against intrusion by any other station when said associated station is off-hook.

* * * * *